Aug. 6, 1968            J. W. RONEY            3,396,246
TANDEM COLLECTOR ASSEMBLY FOR OVERHEAD ELECTRIFICATION SYSTEM
Original Filed Feb. 14, 1966
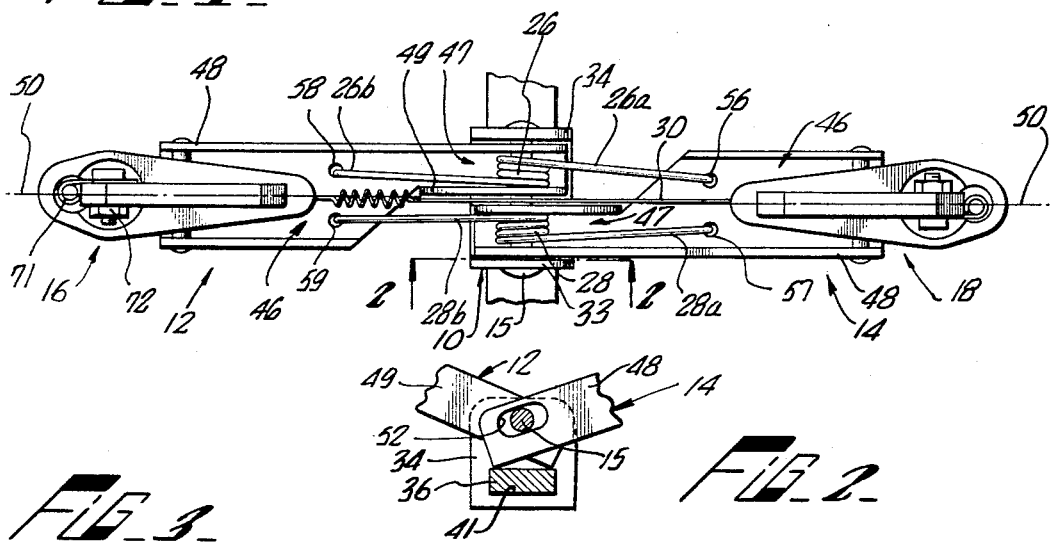
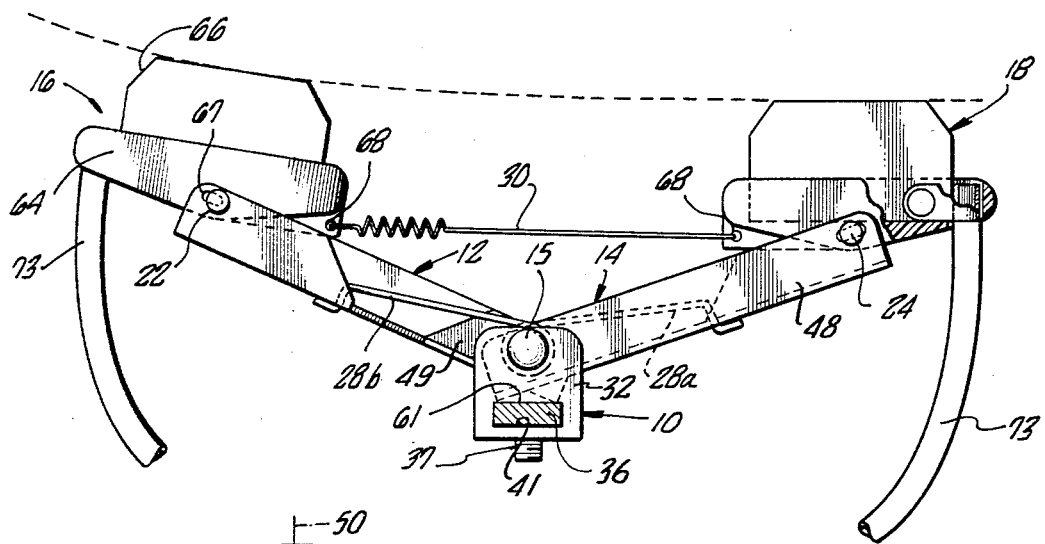
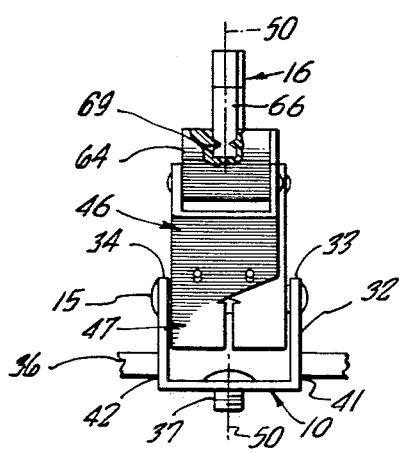
INVENTOR.
JOHN W. RONEY
BY
ATTORNEYS.

United States Patent Office 3,396,246
Patented Aug. 6, 1968

3,396,246
TANDEM COLLECTOR ASSEMBLY FOR OVER-
HEAD ELECTRIFICATION SYSTEM
John W. Roney, Los Altos, Calif., assignor, by mesne assignments, to The Rucker Manufacturing Company, Oakland, Calif., a corporation of California
Continuation of application Ser. No. 527,287, Feb. 14, 1966. This application Jan. 2, 1968, Ser. No. 695,283
17 Claims. (Cl. 191—58)

ABSTRACT OF THE DISCLOSURE

This invention relates generally to a collector assembly for an overhead electrification system, and, more particularly, to a tandem collector assembly designed to operate in continuous and discontinuous systems; this tandem collector assembly forming the present invention comprises generally a base member, a pair of oppositely disposed spring biased movable arms supported thereon, and insulated conductor shoes pivotally supported on the arms for engaging a conductor bar to transfer current to auxiliary equipment associated with the collector assembly.

This application is a continuation of Ser. No. 527,287, filed Feb. 14, 1966, now abandoned.

SPECIFICATION

While multi-head collector mechanisms of one sort are not novel per se, for example, see Patent No. 3,123,191 issued to D. G. Sprigings on Mar. 3, 1964 for a Current Collector Mechanism, the need for a highly versatile tandem collector assembly which satisfies the competing design principles involved in low profile current collector systems has long been sought. The present invention coalesces a number of features to provide an insulated tandem collector assembly effective to conform to variations in the path of the conductor bar of an overhead electrification system, to present a relatively low profile and to function in discontinuous or interrupted systems.

In addition to the foregoing, the present invention provides a safer assembly than many prior art ones. The collector shoes are fully insulated from the assembly body so that there is little likelihood of a worker accidently contacting an electrically "hot" part of the collector head assembly or burning himself by contacting an electrically insulated but heat dissipating surface. This insulation feature also avoids heat fatiguing the various biasing means. Thus, the biasing means will not lose their resiliency.

Yet another advantage of the present invention is obtained by using torsional springs to bias the arms against each other. This allows each shoe to maintain an equal contact pressure against the conductor bar. Since the arms work against each other and not against a base member having no direct connection to the tensioning system, the effectiveness of the biasing means is not degraded.

Broadly speaking, the tandem collector assembly of the present invention comprises a pair of arms mounted in tandem for movement primarily in a first plane and to a lesser extent in planes transverse thereto, a collector head and shoe assembly mounted in the free end of each of the arms for rotation primarily in the first plane and to a lesser extent in planes transverse thereto, first resilient means associated with the arms urging the free ends thereof toward each other and toward the conductor bar with which the collector assembly cooperates, and second resilient means connected between the heads to urge the collector head and shoe assemblies to remain in alignment.

More particularly, the present invention combines a base or yoke member, a pair of channel shaped tandem arms pivotally connected to the yoke for movement with at least two degrees of freedom, an insulated collector head mounting a shoe attached to the outermost ends of each of the arms for movement with at least two degrees of freedom, torsion spring means cooperating with the arms to bias the arms towards each other and towards the conductor bar of an overhead electrification system when the assembly is in operative position, coil spring means associated with the collector heads to urge them to remain in a common plane, and means connecting the shoes to electrical equipment remote therefrom for the transfer of current from the conductor bar to the remote equipment.

These and other objects, features and advantages of the present invention may be more fully understood when the following detailed description is read with reference to the drawings, in which:

FIG. 1 is a plan view of the tandem arm collector assembly forming the present invention;

FIG. 2 is a cross-section view taken along line 2—2 of FIG. 1 to more clearly illustrate the manner in which the arms are pivoted on the yoke;

FIG. 3 is a side view of the tandem arm collector assembly forming the present invention; and FIG. 4 is an end view of the assembly of FIG. 3 with a portion broken away to more clearly show the relationship of the parts thereof.

The tandem collector assembly forming the present invention broadly includes a base or yoke member 10, a pair of elongate, generally channel shaped, tandem arms 12 and 14 pivotally connected on the base member by an axle or pin 15, and a pair of collector head and shoe assemblies 16, 18 pivotally mounted on the opposite outer ends of the arms 12 and 14 by pins 22 and 24, respectively. The arms 12 and 14 are biased towards each other by a pair of torsion springs 26 and 28 which are mounted side by side and concentric of the axle 15 and have opposite ends cooperating with respective middle portions of the arms 12 and 14. An aligning, low k coil spring 30 is connected between the interior ends of the collector head assemblies 16 and 18 to urge the head and shoe assemblies 16 and 18 to maintain a generally common alignment.

Looking more particularly to the construction and operation of the various parts of the present invention, the base or yoke member 10 comprises a generally U-shaped body 32 having a pair of upstanding legs 33 and 34 which are apertured to receive pin 15 which can be in the form of a rivet or similar axle fixed between the legs 33 and 34. A stop bar 36 is held in fixed relation to the bite of the U-shaped member 32 by an Allen set screw 37 and extends outwardly through each leg 33 and 34 by way of rectangular apertures 41 and 42.

The two arms 12 and 14 are identical in construction and can be interchangeably connected to form the tandem collector assembly. The arms 12 and 14 are generally elongate members having a broad U-shaped channel portion 46 at one end, generally having approximately the same width or bite as the bite of the U-shaped body 32, and a reduced U-shaped channel 47 at its other end. The reduced channel has one side common to the outer U-shaped channel 46. The inner leg 49 thereof acts in cooperation with the common leg 48 to provide the channel 47 which has a width approximately, but a little less than, one-half of the width of the bite of the U of body 32 of the base 10.

The reduction channel sections 47 have a pair of elongate slots 52 formed in each side of the legs 48 and 49 of the channel section to pivotally mount the legs in opposite opposed relation on the axle 15. The elongate slots 52 permit the arms 12 and 14 to be moved in various planes which intersect the path of the conductor bar or longitudinal axis thereof, denominated as 50. This relative transverse or non-longitudinal movement of the two arms 12 and 14 and their cooperating collector head and shoe assemblies 16 and 18 permit this tandem collector assembly to track on a conductor bar even though the conductor bar is not in a straight line or even in a simple plane.

The two torsion springs 26 and 28 are mounted concentrically on the axle or pin 15 within the respective reduced channel sections 47 (illustrated most clearly in FIG. 1). The torsion springs 26 and 28 are symmetrically mounted therein whereby the outermost free end 26a and 28a, respectively, of each torsion spring are connected toward the intermediate part of the arm 14 by being projected through a pair of transversely spaced-apart apertures 56 and 57. Thereafter, the ends of the members 26a and 28a are bent at right angles to engage the underside of the arm 14 to maintain them in place on the arm 14. The opposite free ends 26b and 28b of the respective torsion springs 26 and 28 are connected in a similar manner toward the intermediate part of arm 12 by way of transversely spaced-apart apertures 58 and 59. With this arrangement, the torsional springs 26 and 28 act evenly to urge the arms against each other towards a generally closed position or, what is the same thing, towards the conductor bar as shown by dotted line in FIG. 3. Moreover, the symmetrical connection eliminates any cocking moment on the axle 15.

Without any restraint, the arms 12 and 14 would move towards each other pushing the collector head and shoe assemblies 16 and 18 upward and towards each other (with respect to orientation of the assembly as shown in FIG. 3). However, the stop bar 36 cooperating with the yoke 10, acts to provide a position stop for the upward movement of the arms 12 and 14 (illustrated most clearly in FIG. 3). The size of the stop bar 36 is selected whereby the ends of the reduced channel sections 47 contact the upper surface 61 thereof to prevent further upward movement of the arms 12 and 14 and their cooperating collector head and shoe assemblies 16 and 18. It will be apparent that by the selection of this stop bar 36 and its spaced-apart relation to the pin and axle 15, it is possible to pre-select the particular stop location for the arms 12 and 14.

The collector head and shoe assemblies 16 and 18 are pivotally mounted on the pins 22 and 24 affixed between the spaced-apart legs of the outer U-shaped channel members 46 to permit rotation of the collector head and shoe assemblies 16 and 18 in a plane generally in line with the longitudinal plane of movement of the assembly along a conductor bar.

The collector head and shoe assemblies 16 and 18 each include an insulated collector head 64 and a conductive shoe of copper or similar material 66 affixed therein. The insulated collector heads 64 has a transverse slot 67 formed therethrough for pivotally supporting collector heads 64 on the pins 22 and 24. There is also provided an aperture 68 in the interior end of each of the collector heads 64.

A low $k$, relatively weak, coil spring 30 is connected between the interior sides of the opposed collector heads 64 at the aperture 68 and acts to urge the collector heads 64 and their cooperating conductive shoes 66 to be maintained in a common plane lying generally along the longitudinal direction of movement of the collector assembly along the conductor bar.

It should be noted that the strength of the coil spring 30 is quite small. It contributes very little to the contact pressure exered by the collector head and shoe assemblies 16 and 18 against the conductor bar shown in dotted line in FIG. 3. The contact pressure for the collector shoes 66 against the conductor bar is provided by the torsional springs 26 and 28, while the low $k$ coil spring 30 acts merely to urge the edges of the shoe 66 to maintain an in-line position. This is particularly necessary when the collector assembly is used in a discontinuous circuit for the collector assembly must be guided back onto a conductor bar after temporary interruption. The low $k$ spring performs this necessary function but leaves the shoe and head assemblies free to adjust with little or no binding.

The conductive shoes 66 are formed with a pair of generally longitudinally oriented grooves 69 on each side, as particularly shown in the cut-away illustration of FIG. 4, which are engaged by the insulated collector head 64 to maintain the conductive shoe 66 in situ. An electric wire receptacle 71 is provided in cooperation with a screw member 72 at one end of the conductive shoe 66 to permit connection of an electrical lead 73 to the conductor shoe 66 for connection at a remote point to auxiliary equipment to which current is to be supplied by the overhead electrification system.

In the exemplary embodiment of the present invention, the silhouette of the overall tandem collector assembly is maintained quite low to provide approximately 1½ inch travel or variation between the normal movement of the collector head and shoe assemblies 16 and 18 with respect to the conductor bar. The torsion springs 26 and 28 are selected at approximately sixteen pound-inches per turn and designed with a 2½ inch fulcrum between the point of rotation for the arms at axle 15 and the point of attachment for the collector head and shoe assemblies 16 and 18. With these proportions and a quarter bias turn of the torsion springs, the upward force of the conductor shoes against the conductor bar is approximately three and one-half pounds per shoe. In this particular type of low silhouette overhead electrification system, it is desirable to keep the collector contact pressure between 2½–5 pounds per shoe. Substantially none of the three and one-half pounds of collector head pressure need be provided by the low strength coil spring 30 which acts primarily to keep the two collector head and shoe assemblies 16 and 18 in alignment.

From the foregoing description, it can be seen that the present tandem collector assembly permits the collector head and shoe assemblies 16 and 18 to move with at least two degrees of freedom with respect to the arms 12 and 14. In turn, the arms 12 and 14 can move primarily in the plane of the conductor bar, but to a more limited extent in planes transverse thereto to provide the necessary degrees of freedom for the overall movement of the arm. The overall assembly can adapt to variations in the direction and sense of the conductor bar, and adapt the assembly for use in both continuous and discontinuous systems which are tailored to specific requirements of a given industrial plant. It makes no difference whether the systems are vertical or horizontal, or use inside and/or outside curves. The exemplary embodiment can be utilized on a one foot horizontal curve or a vertical curve of six feet or less. These give extreme versatility to the overall collector assembly.

As noted heretofore, the conductive shoes 66 are insulated from the rest of the system so that there is no danger of electric current flowing through the arms 12 and 14 and the associated yoke 10, which parts a workman or other personnel in the plant might very well touch during operation and use. The insualted shoes also prevent heat from the conductor bar and conductive shoes from reaching any of the biasing members which would materially shorten their useful lives.

While this invention has been described with respect to a specific embodiment, it should be apparent to those skilled in the art that various changes may be envisaged without departing from the scope of the present invention. For this reason, the invention should be limited only to the extent of the specific recitations in the claims.

I claim:
1. A tandem collector assembly adapted to engage the conductor bar of an overhead electrification system comprising:
   (a) a pair of arms mounted in tandem for movement primarily in a first plane which is coincident with the plane of the conductor bar when the collector assembly is operatively cooperating therewith, and to a lesser extent in planes transverse thereto;
   (b) a collector head assembly mounted in the free end of each of said arms for rotation primarily in said first plane and to a lesser extent in planes transverse thereto;
   (c) first resilient means associated with said arms to urge the free ends thereof toward each other and towards the conductor bar with which the collector assembly cooperates; and
   (d) second resilient means connected between said collector head assemblies to urge the conductive shoes thereof to remain in alignment.

2. A tandem collector assembly adapted to engage the conductor bar of an overhead electrification system in accordance with claim 1 wherein the collector heads are formed of an insulating material to electrically isolate the conductive shoes from the other parts of said tandem collector assembly.

3. A tandem collector assembly adapted to engage the conductor bar of an overhead electrification system in accordance with claim 1 wherein the limited transverse movement of the arms and collector head assemblies is obtained by forming slots in said arms and said collector heads to pivotally support them for primary movement in said first plane.

4. A tandem collector assembly adapted to engage the conductor bar of an overhead electrification system comprising:
   (a) a yoke;
   (b) tandem disposed arms pivotally connected to said yoke at one set of their ends so that each can move with two degrees of freedom;
   (c) a collector head mounting a shoe attached to the outermost end of each of said arms so that it can move with two degrees of freedom;
   (d) spring means cooperating with the yoke and the arms to bias the arms towards each other and towards the conductor bar of an overhead electrification system when the collector assembly is operatively cooperating therewith;
   (d) alignment means associated with said collector heads to urge said heads to remain in a common plane; and
   (f) means connecting said tandem shoes to electrical equipment remote therefrom for the transfer of current from the conductor bar to the auxiliary equipment.

5. A tandem collector assembly adapted to engage the conductor bar of an overhead electrification system in accordance with claim 4 wherein said collector heads are formed of an insulating material to insulate the yoke and arms of the tandem assembly from the collector shoes.

6. A tandem collector assembly adapted to engage the conductor bar of an overhead electrification system in accordance with claim 4, and including stop means associated with the yoke to prevent the arms from moving towards each other beyond a predetermined separation.

7. A tandem collector assembly adapted to engage the conductor bar of an overhead electrification system in accordance with claim 4 wherein the means pivotally connecting the arms to the yoke include slots formed in the arms so that the collector heads and shoes can move in the two degrees of freedom system including the plane of the conductor bar and planes transverse thereto, and said collector heads are slotted to permit them to move with the same two degrees of freedom with respect to the ends of said arms.

8. A tandem collector assembly adapted to engage the conductor bar of an overhead electrification system in accordance with claim 7 wherein the spring means is a pair of torsion springs symmetrically mounted about the axle pivotally supporting the arms on the yoke, and said alignment means is a relatively small coil spring which does not contribute materially to the contact pressure of the collector head.

9. A tandem arm collector assembly adapted to engage the conductor bar of an overhead electrification system comprising, in combination,
   (a) a base member having an axle mounted thereon;
   (b) first and second arms having slots formed in one set of their ends to mount said arms on said axle for movement generally in a plane common to the conductor bar but with some movement in plans transverse thereto;
   (c) said arms mounted so that they extend outwardly from opposite sides of said base member generally in said common plane;
   (d) insulated collector heads with conductive shoes mounted thereon having slots formed therethrough to permit their pivotal attachment to the other ends of said arms for rotation generally in said common plane but with some movement in planes transverse thereto;
   (e) a pair of torsion springs concentrically mounted in side-by-side relation on said axle, the opposite ends of each spring connected to respective ones of said first and second arms to urge said arms and their pivotally mounted collector heads toward the conductor bar of the overhead electrification system and away from said base member;
   (f) stop means on said base member to limit the rotational movement of said arms with respect to said base member;
   (g) a low $k$ coil spring connected between the interior ends of said collector heads to urge the edges of said conductive shoes to remain in a common plane; and
   (h) terminal means associated with said conductive shoes to permit current from the conductor bar to be transferred through said shoes to auxiliary equipment remote therefrom.

10. A tandem arm collector assembly adapted to engage the conductor bar of an overhead electrification system comprising, in combination,
    (a) a U-shaped yoke supporting an axle between the outer parts of the legs thereof in a plane transverse to the longitudinal axis of the conductor bar when the assembly is operatively associated therewith;
    (b) first and second tandem arms, each one of said arms having one end formed in the shape of a channel approximately the same width as the bite of the U-shaped yoke and the other end formed in the shape of a reduced channel with a bite extending to a little less than half the width of the bite of said U-shaped yoke;
    (c) elongate slots formed in the legs of each of said reduced channels to mount said arms in side-by-side relation on said axle with the large U-shaped ends of said arms extending outwardly in opposite directions from said yoke for rotation generally in the longitudinal plane of said conductor bar but with sufficient play to allow the arms to move in other planes to accommodate variations in the lie of the conductor bar;
    (d) pins transversely mounted on the outer ends of said arms between the legs of the outwardly disposed channels thereof;
    (e) insulated collector heads having removable conductive shoes mounted longitudinally therein formed with transverse slots therethrough so as to mount said head and shoe assemblies on the pins of their respective arms whereby said heads are rotatable in said longitudinal plane and to limited extent in other planes to said longitudinal plane so that said collector heads can traverse inside and outside curved conductor bars;

(f) a pair of torsion springs rotatably mounted on the axle of said yoke, one interior of each of said reduced channels, the transverse outermost arms of each of said torsion springs held in transverse spaced-apart relation toward the intermediate part of one of said arms and the transverse inwardly disposed arms of each of said torsion springs held in transverse spaced-apart relation toward the intermediate part of the other of said arms so as to urge said arms toward each other and toward the conductor bar of the overhead electrification system with which it cooperates;

(g) a stop bar transversely mounted through the legs of said U-shaped york adjacent the bite thereof to cooperate with said one ends of said arms to limit the movement of said arms with respect to said yoke; and (h) a low $k$ coil spring connected between the inwardly disposed ends of said insulated collector heads so as to urge said heads and their associated shoes to stay in alignment to facilitate use of the collector head assembly in discontinuous electrification systems.

11. A tandem current collector comprising
(a) a base;
(b) first and second elongated collector arms independently pivotal about the same axis on the base and extending generally in opposite directions from the base;
(c) first and second collector heads respectively mounted on the outer ends of the first and second collector arms; and
(d) at least one torsional spring wound about said axis and coupled at its opposite ends respectively to the first and second collector arms for spring loading said arms against one another about said axis.

12. The apparatus of claim 11 further characterized by the fact that a coil spring is connected directly between the near ends of the collector heads to urge them into co-planar alignment, said coil spring being weak compared to the torsional spring so as to contribute a minimum to loading the collector arms about the axis.

13. The apparatus of claim 11 further characterized by the facts that:

(a) the base is in the form of a yoke having a pair of spaced apart legs, with a pivot pin extending between the legs of the yoke;
(b) each collector arm has its outer end formed in the shape of a large channel of about the same width as the yoke, and has its inner end formed in the shape of a reduced channel offset to one side of the large channel and of about one-half the width of the yoke;
(c) the inner ends of both collector arms have aligned openings in the legs of the reduced channels for receiving the pivot pin; and
(d) the collector arms are mounted on the pivot pin, with the reduced channels disposed in side-by-side relationship in the yoke and with the large channels disposed in alignment with the yoke, so that the reduced channel of each arm is aligned with the large channel of the opposite arm.

14. The apparatus of claim 13 further characterized by the fact that first and second torsional springs are wound about the pivot pin respectively within the confines of the reduced channels of the first and second collector arms, each torsional spring having one end connected to its associated collector arm and having its other end connected to the aligned portion of the large channel of the opposite collector arm.

15. The apparatus of claim 13 further characterized by the fact that the aligned openings in the legs of the reduced channel portion of each collector arm are elongate slots which provide a restricted degree of freedom for the collector arms in planes parallel to the pivot pin.

16. The apparatus of claim 15 further characterized by the fact that the collector heads are mounted pivotal on pins caught in elongate slots in the legs of the large channels of the respective collector arms near the outer ends thereof.

17. The apparatus of claim 13 further characterized by the fact that an adjustable stop bar is mounted below the pivot pin in the yoke for engagement with the bight formed by the extreme inner ends of the collector arms, in order to limit the pivotal position of the collector arms about the pivot pin.

References Cited
UNITED STATES PATENTS

| | | | |
|---|---|---|---|
| 760,736 | 5/1904 | Greenwood | 191—58 |
| 773,048 | 10/1904 | Briggs | 191—58 |

ARTHUR L. LA POINT, *Primary Examiner.*

D. F. WORTH, *Assistant Examiner.*